July 3, 1951  J. M. PEARSON  2,558,977

READILY LOCATABLE MAGNETIC GO-DEVIL

Filed Sept. 20, 1946

INVENTOR.
John M. Pearson
BY
ATTORNEYS

Patented July 3, 1951

2,558,977

UNITED STATES PATENT OFFICE 2,558,977

READILY LOCATABLE MAGNETIC GO-DEVIL

John M. Pearson, Swarthmore, Pa., assignor to Sun Oil Company, Philadelphia, Pa., a corporation of New Jersey Application September 20, 1946, Serial No. 698,269

1 Claim. (Cl. 15—104.06)

This invention relates to pipe line devices and, more particularly, to a class of such devices including the so-called go-devils which are adapted to be inserted within a pipe line for purposes of cleaning, spreading inhibitors, separating liquids flowing in succession, etc., and which are moved therethrough in response to the fluid flow within the pipe.

The petroleum industry frequently has occasion to use various devices known as go-devils which is a term including pipe scrapers, displacers, separators and, in general, any pipe insert adapted to be propelled through pipe lines which transport fluid petroleum products. The accumulation of either foreign material or more readily solidified petroleum products on the pipe walls requires constant attention in order that the flow of the petroleum fluid may be unrestricted. To clean out these accumulations adhering to the side of the pipe, which is often buried in the ground or submerged in water, without dismantling the pipe, it has been the practice to insert a go-devil or pipe line scraper at a convenient point in the pipe line and flush it through the pipe by the force of the flowing liquid. Frequently, the go-devil accumulates sufficient material ahead of it to cause it to stop in the pipe and prevent further flow of liquid. Prior to this invention, when a go-devil stopped within the pipe and consequently blocked the fluid flow, it was necessary to excavate or raise the pipe line if submerged and drill a series of holes so that pressure recording devices could be used to locate the obstruction by bracketing the applied pressure.

The go-devil has many uses in the petroleum industry. For example, it is used to place inhibitors on the inside of the pipes so as to reduce the chemical action of the fluids flowing through the lines. A knowledge of the speed of movement so as to insure a proper coating of the inhibitor inside the pipe is now determinable by the use of the method disclosed herein. Nor has it been possible to determine the position of a go-devil when it has been used as a separator between different fluids which are caused to flow through the pipe line in succession. Such knowledge will enable pumping stations to be promptly cut into the new fluid, thereby saving time and reducing waste. With the detection of the relative position of go-devils to the pumping stations, a close check on the flow of the conveyed liquid and the proper manipulation of the pumping station's equipment will enable considerable saving.

It is therefore, the principal object of this invention to provide an improved method and apparatus for the operation of a pipe line which will enable the rapid and certain location from a point remote and exterior of the pipe line of a go-devil or scraper which has stalled without requiring excavation and pressure bracketing as described above.

It is also an object of this invention to provide a go-devil which produces a magnetic field continuously as it moves through the pipe line so that a detecting device can determine the exact position of the go-devil within the pipe at any given instant.

It is yet another object of this invention to provide an improved form of go-devil or displacer adapted to be inserted within the pipe between different liquids, the device including a means of producing a magnetic field which can be detected from a remote point exterior to the pipe to indicate the relative position of the two fluids within the pipe line.

It is still a further object of this invention to provide a pipe line device of the class described with a magnetic field capable of detection from a remote point exterior of the pipe to indicate the relative position of the device from time to time, thereby enabling an accurate check on the rapidity of flow of the fluid within the pipe line.

The invention contemplates the use of a magnetic field as a part of the go-devil. This field may be created through magnetizing the entire device by subjecting it to a magnetizing field produced by direct current for a short period of time. Another way of producing the magnetic field would be to magnetize a case-hardened steel shaft, which will retain a magnetic charge for considerable time, and separate the various attachments carried by the shaft by means of bronze bushings or other non-magnetic material. A third method of adapting a magnetic field to the go-devil would be to attach cylindrical magnets to the main shaft between the attachments, being careful that the magnetic poles are so arranged as not to cancel each other, and using non-magnetic material for the other metal parts. It will be noted that for inducing a magnetic field, no modification of the standard commercially available go-devil is required, provided the first mentioned method of magnetizing the entire device is used. By proper selection of material for use in a standard go-devil, optimum magnetic properties can be had. This is the preferred embodiment of the invention.

Field tests show that the magnetism carried by a properly magnetized go-devil is detectable where the pipe line is buried three feet or less in the ground by the use of a simple dip needle or compass. Detecting devices such as a gradiometer, illustrated in Patent No. 2,379,716 to Hull, or a magnetometer, shown in Patent No. 2,252,059 to Barth, detects magnetic fields at much greater distances (up to twenty feet) and enables the exact location of the magnetized go-devil to be determined.

There is a shield effect caused by the steel pipe commonly used in the petroleum industry, which tends to reduce the magnetic field induced by the go-devil at all points outside the pipe. It is an experimental fact that the percent reduction of the magnetic field is small at great distances and becomes greater at short distances where the field is intrinsically stronger. The net result is that a magnet of 100,000 E. M. U. in moment produces a field easily distinguished from the normally existing magnetic fields about the line, and is detectable at distances of ten to twenty feet, which, in pipe line work, is a practical working distance.

Further objects and advantages of this invention will be apparent by reference to the following specification and drawings wherein the preferred embodiment of this invention is illustrated as applied to one form of go-devil.

Figure 1:
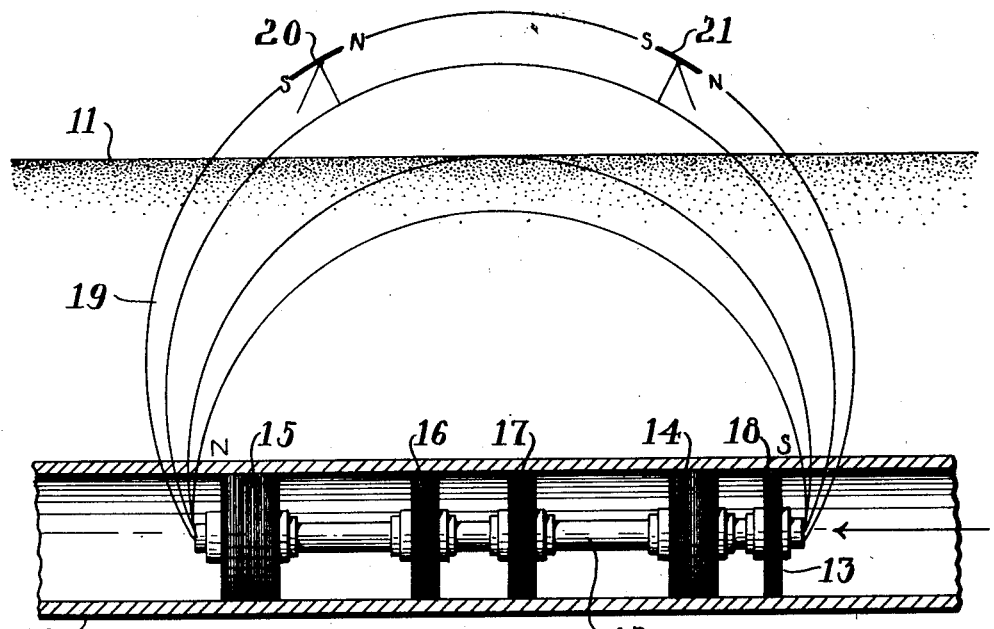
Figure 1 is a schematic diagram illustrating a magnetized go-devil.
Figure 2:
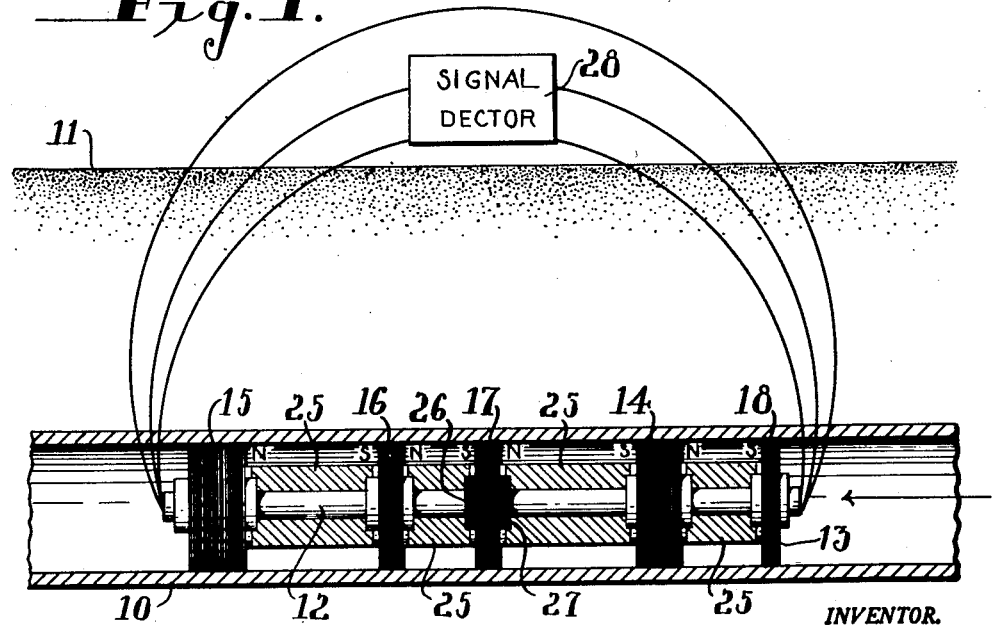
Figure 2 is a schematic diagram illustrating a go-devil with cylindrical magnets attached.

Referring to Figures 1 and 2, a pipe line 10 buried beneath the ground 11, is adapted to convey a fluid under pressure flowing in the direction indicated by the arrow. A pipe line scraper or go-devil is inserted within the pipe 10 for one of several reasons as practiced in pipe line operations, and is adapted to be moved in the direction of the fluid flow in response to the pressure of the fluid acting on the exposed end surface 13.

In Figure 1 the entire go-devil, including shaft 12, brushes 14 and 15 except rubbers 16, 17 and 18 have been magnetized to the order of 100,000 E. M. U. in moment by subjection to the field of a direct current electromagnet of about 600 oersteds.

The go-devil retains this magnetic property for considerable periods of time and produces a magnetic field 19 of intensity greater than the residual magnetism of the steel pipe 10 or any terrestrial magnetic fields of normal density present in the vicinity. Dip needles 20 and 21 mounted at predetermined points on the earth's surface, close enough to the pipe, move in accord with magnetic field 19 as the go-devil passes through the pipe. Where the go-devil is blocked within the pipe 10, it can readily be located by following the pipe line with a dip needle 20 and 21, or by a detecting device 28 of the type illustrated in the patents referred to above, shown in Figure 2.

Referring particularly to Figure 2 an alternative method of inducing a magnetic field about the go-devil is demonstrated. The commercially available go-devil such as discussed in Figure 1 is adapted to carry cylindrical magnets 25 in which case the metal bushings 26 and 27, incidental metal parts, and shaft 12 are made of bronze or other non-magnetic material. The poles of the magnets are arranged on the shaft as shown by N and S indicating north and south poles of the magnets respectively so as to induce a strong magnetic field 19. A detecting device 28 of the magnetometer or gradiometer type, already discussed, is shown in schematic form. The gradiometer is the preferred detector since it can be made very sensitive to the field of the go-devil, and relatively insensitive to fields from the pipe metal or from remote sources.

It will be understood that only one form of go-devil with suggested detecting devices, has been illustrated as an example of my invention and that the method and apparatus disclosed is broadly applicable to devices of the class described.

I claim:

A go-devil adapted to transport a magnetic field for use in pipe line exploration comprising in combination a non-magnetic shaft, a plurality of non-magnetic brushes and rubbers mounted on said shaft, magnetized retentive cylindrical metal segments enclosing said non-magnetic shaft and spaced between said brushes and rubbers, the magnetic fields of said segments being additive to provide a large magnetic moment of the complete go-devil.

JOHN M. PEARSON.

REFERENCES CITED

The following references are of record in the file of this patent:

UNITED STATES PATENTS

| Number | Name | Date |
|---|---|---|
| 576,425 | Bilton et al. | Feb. 2, 1897 |
| 1,547,440 | Penn | July 28, 1925 |
| 1,662,429 | Lowy | Mar. 13, 1928 |
| 2,092,951 | Blake | Sept. 14, 1937 |
| 2,150,440 | Hargreaves | Mar. 14, 1939 |
| 2,275,190 | Lowry | Mar. 3, 1942 |
| 2,342,561 | Trevaskis | Feb. 22, 1944 |
| 2,392,144 | Hall | Jan. 1, 1946 |
| 2,428,326 | Fay | Sept. 30, 1947 |